United States Patent
McConnell et al.

(10) Patent No.: US 6,172,940 B1
(45) Date of Patent: Jan. 9, 2001

(54) TWO GEOPHONE UNDERWATER ACOUSTIC INTENSITY PROBE

(75) Inventors: James A. McConnell, Port Matilda; Gerald C. Lauchle; Thomas B. Gabrielson, both of State College, all of PA (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/237,529

(22) Filed: Jan. 27, 1999

(51) Int. Cl.[7] .................................................. H04R 1/00
(52) U.S. Cl. ...................... 367/178; 367/171; 367/173; 367/188; 367/131; 181/122
(58) Field of Search ..................... 367/153, 173, 367/178, 182, 188, 171, 131; 181/122, 401, 402; 73/570, 649, 646

(56) References Cited

U.S. PATENT DOCUMENTS

| | | | |
|---|---|---|---|
| 3,593,258 | * 7/1971 | Slavens ................................ | 367/182 |
| 3,720,909 | * 3/1973 | Sikora ................................. | 367/173 |
| 3,980,985 | * 9/1976 | Dale et al. ........................... | 367/173 |
| 5,084,846 | * 1/1992 | Smith, Jr. ............................ | 367/188 |
| 5,189,642 | * 2/1993 | Donoho et al. ...................... | 367/188 |

* cited by examiner

Primary Examiner—Ian J. Lobo
(74) Attorney, Agent, or Firm—Ron Billi

(57) ABSTRACT

Acoustic intensity is measured by a submerged probe consisting of two passive geophones mounted in spaced relationship with their sensing axes aligned. The geophones are connected through a cable to a remote spectrum analyzer in which acoustic intensity is computed from the velocity gradient between the two geophones. The exclusive use of geophones, which inherently have low impedance outputs, eliminates the need for preamplification in the probe. The geophones are mounted inside an acoustically transparent, thin rubber shell, which reduces the effects of noise due to flow.

3 Claims, 3 Drawing Sheets

TWO GEOPHONE UNDERWATER ACOUSTIC INTENSITY PROBE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to the measurement of underwater acoustic intensity, and more specifically to a novel apparatus having advantages over known underwater acoustic intensity probes.

Underwater acoustic intensity has been measured by various devices. For example, U.S. Pat. No. 4,982,375, dated Jan. 1, 1991 describes an acoustic intensity probe using multiple hydrophones and a fast Fourier transform analyzer. U.S. Pat. Nos. 3,274,539, dated Sep. 20, 1966 and 3,311,873, dated Mar. 28, 1967, describe devices which use a hydrophone and an accelerometer in combination. U.S. Pat. No. 5,392,258, dated Feb. 21, 1995, describes a device using a hydrophone and a geophone in combination. A similar device is described in T. B. Gabrielson et al., "A Simple Neutrally Buoyant Sensor for Direct Measurement of Particle Velocity and Intensity in Water," J. Acoust. Soc. Am. 97, 2227–2237 (1994). Each of these devices uses at least one piezoelectric sensor, either in a hydrophone, or in an accelerometer.

A piezoelectric sensor is inherently a high impedance device. Because of its high impedance, the sensor, by itself, cannot deliver an output signal over a long distance without significant attenuation. Accordingly, it is usually necessary to locate a preamplifier in close proximity to the sensor, and to provide impedance matching networks at the input and output of the preamplifier, at the location of the sensor.

Another drawback of the intensity probe using hydrophone pressure sensors is that the pressure sensors are directly exposed to flow as the probe moves through a body of water (or as the body of water flows past the probe), and consequently subject to noise generation due to turbulent flow.

SUMMARY OF THE INVENTION

An important object of this invention is to provide an underwater acoustic intensity probe that can be used to transmit an output signal over a long distance, without the need for preamplification or other signal conditioning. Another object of the invention is to simplify underwater measurements at depths that exceed the maximum allowable length of signal cable connecting a piezoelectric sensor to its amplifier. Still another object of the invention is to reduce measurement errors associated with hydrodynamic noise due to flow over the body of the probe.

The invention takes advantage of the inherently low electrical impedance of a geophone. Because of the low impedance of the geophone, its output signal can be transmitted over relatively long distances without preamplification or other signal conditioning at the location of the geophone.

The term "geophone" as used herein refers to a passive analog transducer which senses mechanical motion by means of an inertial mass suspended in a rigid supporting structure, and in which the relative movement of the inertial mass and the supporting structure is converted to an electrical output by a coil movable in a magnetic field. The coil has a low electrical impedance, and the electrical output of the coil is a voltage that is proportional to the velocity of the coil relative to the magnetic field. In the geophone used in accordance with this invention, the inertial mass is mounted for linear movement along an axis, and thus the geophone is responsive to motion along that axis. When the geophone is immersed in water, its output provides a measure of acoustic particle velocity.

The discovery that two geophones can be used to measure underwater acoustic intensity arose from the observation that acoustic pressure can be inferred from the velocity gradient between two geophones disposed in spaced relationship to each other and mounted with their sensing axes in alignment. This is analogous to, but not readily apparent from, the known technique of determining acoustic particle velocity from the pressure gradient between two hydrophones. The low impedance electrical outputs of the two geophones can be connected through a long cable to a remote spectrum analyzer, without the need for intervening signal amplification at the location of the geophones.

The underwater acoustic intensity probe in accordance with the invention comprises a pair of passive geophones disposed in spaced relationship to each other and mounted so that the axes along which they are sensitive to velocity are aligned.

Preferably, the geophones are supported inside an acoustically transparent shell filled with liquid by mounts having sufficiently high radial stiffness to inhibit misalignment of the sensing axes, but relatively low axial stiffness so that acoustically induced axial movement of the geophones is substantially unrestricted. A foam structure encasing each geophone provides neutral buoyancy, and the geophones are magnetically shielded from each other. A cable, conducts electrical signals from the passive geophones directly to a spectrum analyzer at a remote location, and the spectrum analyzer is used to compute acoustic intensity from the velocity gradient between the two geophones as determined from the geophone output signals transmitted through the cable.

The two-geophone probe obviates preamplification, impedance matching and other signal conditioning, and consequently simplifies deep water acoustic measurements. The acoustically transparent, fluid-filled housing for the geophones reduces hydrodynamic noise resulting and permits more accurate measurements.

Other objects, advantages and novel features of the invention will become apparent from the following detailed description of the invention, when considered in conjunction with the accompanying drawings.

DESCRIPTION OF THE PREFERRED EMBODIMENTS

Figure 1:
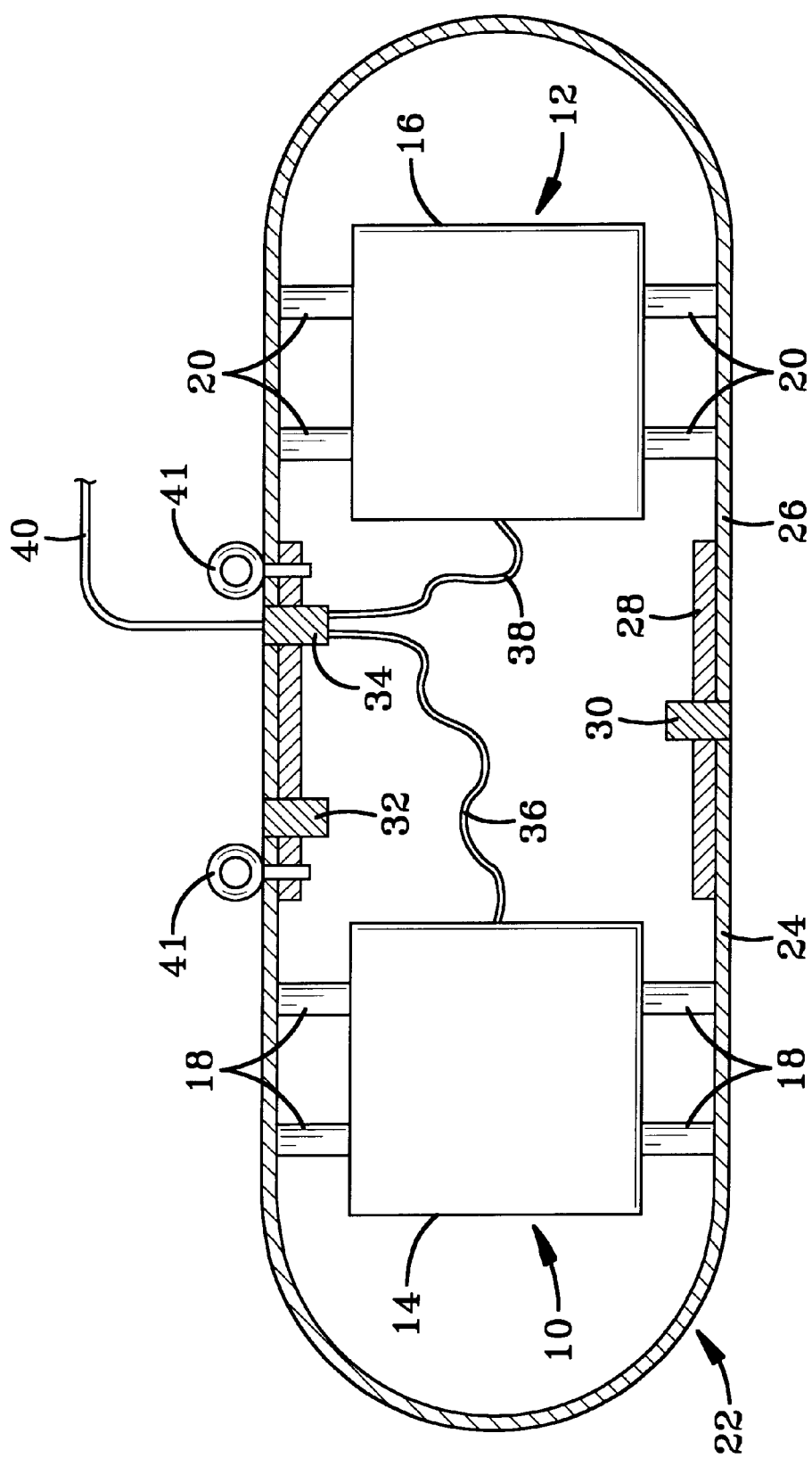
FIG. 1 is schematic axial cross section of a one-dimensional, two-geophone probe in accordance with the invention.

The simplest version of the probe in accordance with the invention is a one-dimensional, two-geophone probe. One such probe is shown in FIG. 1, and comprises a pair of sensors 10 and 12. Each sensor comprises a rigid foam block, e.g. of syntactic foam) encasing a magnetically shielded geophone (not shown in FIG. 1). The foam blocks 14 and 16 have a size and density such that each assembly consisting of the foam block and the shielded geophone is neutrally buoyant. The foam blocks are supported, by elastic suspension elements 18 and 20 respectively, inside a thin shell 22, which has a cylindrical central portion and rounded, e.g. hemispherical, ends.

The shell 22 is preferably made of rubber, and comprises two identical halves 24 and 26 secured to a centrally located, plastics, reinforcing tube 28 having a water fill valve schematically shown at 30, an air purge valve, schematically shown at 32, and an electrical connector, schematically shown at 34. The electrical connector is used to connect geophone output leads 36 and 38 to an external cable 40, which carries the geophone output signals to a remote location. Eyebolts 41, affixed to the reinforcing tube 28, are used to connect an external mechanical suspension to the probe.

The shell halves are sealed to the reinforcing tube by a water-proof sealing compound, and the water fill valve, the air purge valve, the electrical connector and the eyebolts are all water-tight, allowing the shell to be filled completely with water. To the extent practicable, the housing, the valves, the electrical connector, the sealing compound, and the other associated components are selected so that they have a characteristic acoustic impedance nominally the same as that of water.

The halves of the housing, being made of thin rubber, are acoustically transparent; they do not move when exposed to an acoustic field. Thus, when the housing is filled with water, or a water-like liquid, and submerged in a body of water, the acoustic performance of the geophones is substantially the same as it would be if the housing were not present. On the other hand, the housing prevents the geophones from being exposed directly to flow resulting from relative movement of the probe and the body of water in which it is submerged. The rounded ends of the housing assist in noise reduction.

Figure 2:
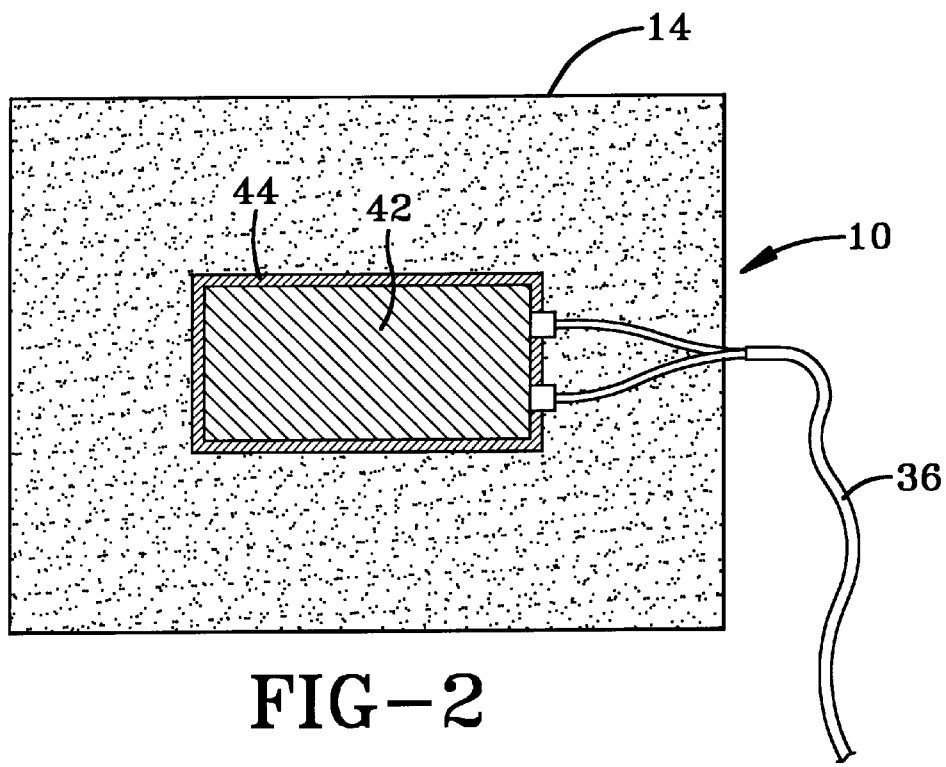
FIG. 2 is a schematic cross-sectional view of a neutrally buoyant, magnetically shielded geophone sensor, as used in the probe of FIG. 1.

As shown in FIG. 2, the sensor 10 comprises a rigid foam block 14, preferably of syntactic foam, cast for example from a mixture of epoxy resin and glass microballoons. The foam block 14 is preferably cylindrical, and it has a density less than that of water. A geophone 42 is surrounded by a mu metal magnetic shield 44, and the shielded geophone is cast into the foam block. The density of the combined geophone, shield and foam block is substantially equal to that of water so that the combination is neutrally buoyant, and a true measure of acoustic particle velocity can be obtained. The electrical leads 36, carrying the geophone output signal are also cast into the foam block 14. Sensor 12 in FIG. 1 is similar, preferably identical, to sensor 10.

Figure 3:
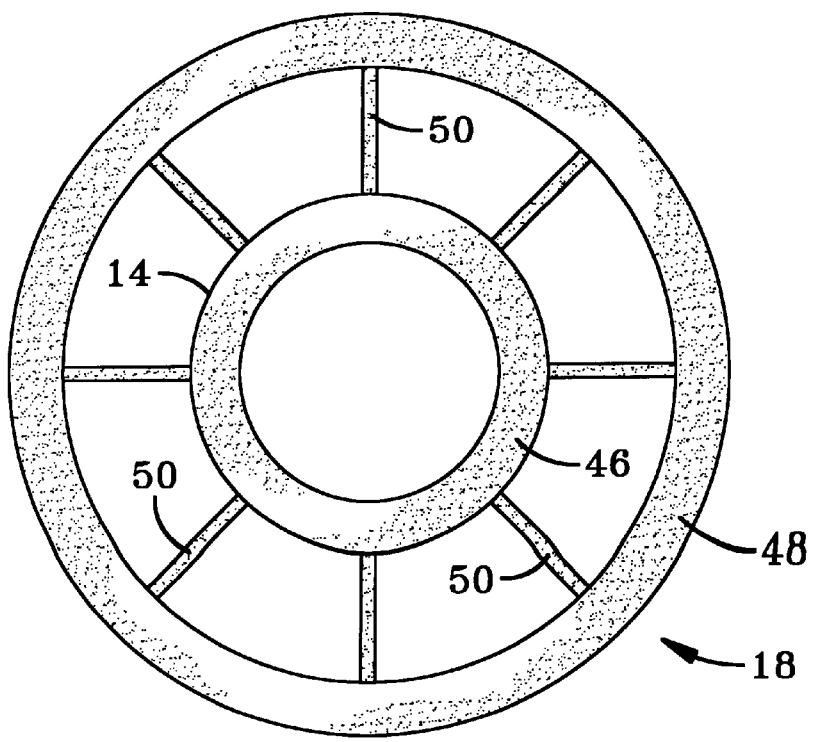
FIG. 3 is an elevational view of a suspension for supporting the geophone in a housing.

In FIG. 3, one of the elastic suspension elements 18 is shown in elevation. It comprises an inner ring 46 which fits tightly around the foam block 14 and is secured to the foam block by an adhesive. It also comprises an outer ring 48, which is adhesively secured to the inner wall of the housing 22 (not shown in FIG. 3), and a set of radial spokes 50, connecting the inner and outer rings. The inner and outer rings and the radial spokes are preferably a molded unit made of rubber. As shown in FIG. 1, each of the sensors 10 and 12 is supported by two suspension elements.

The suspension elements 18 and 20 (FIG. 1) support the sensors 10 and 12, with their sensing axes in alignment along an axis extending in the lengthwise direction through the housing 22.

The spokes 50 of the suspension elements are thick in the axial direction as shown in FIG. 1, and provide the suspension with a high degree of radial stiffness to inhibit misalignment of the sensing axes of the sensors. However, they also have a low stiffness in the axial direction, and allow the sensors to move freely in the axial direction in response to an acoustic field.

Figure 4:
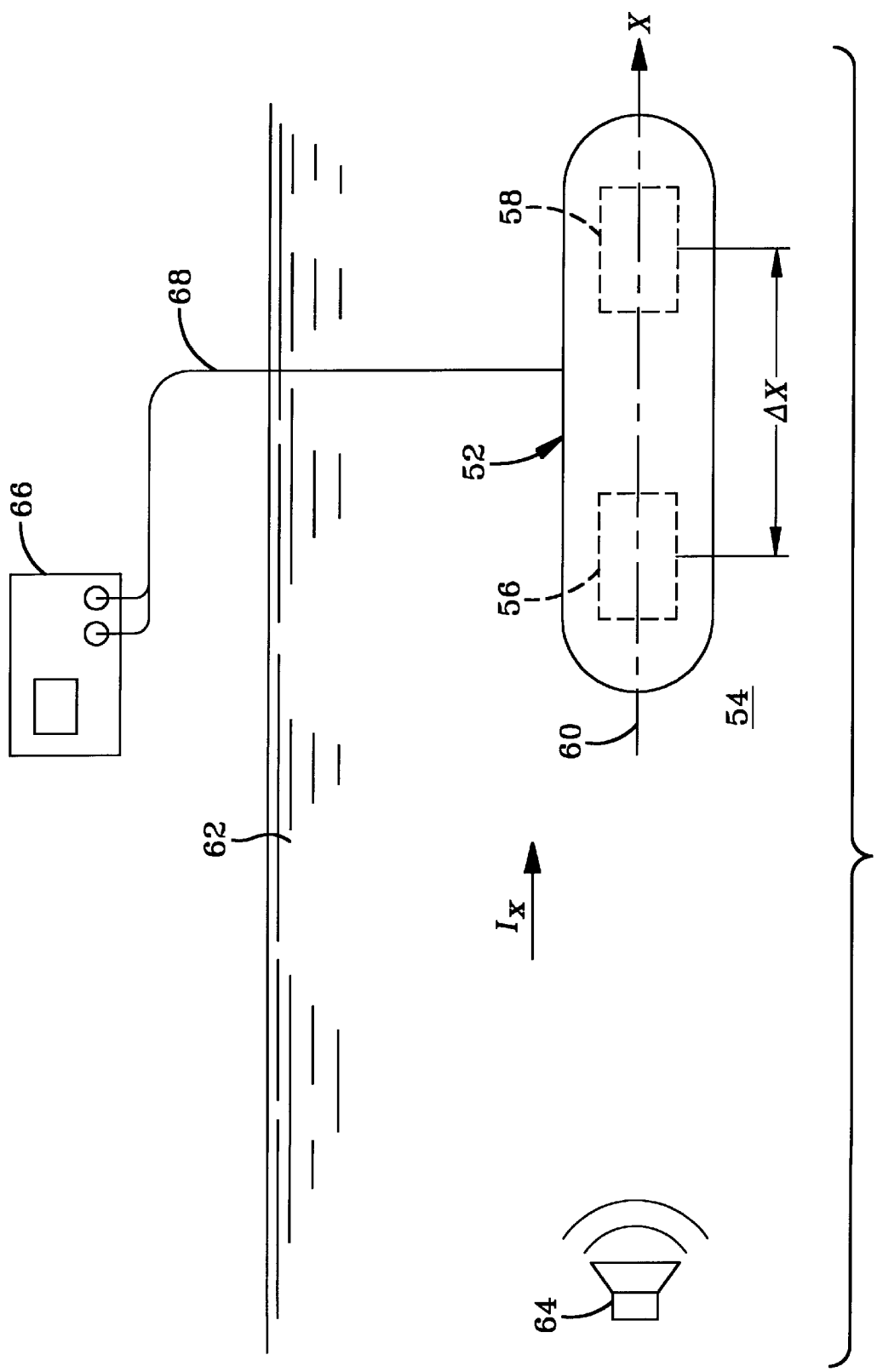
FIG. 4 is a schematic elevational view showing a typical set-up for measuring underwater acoustic intensity using the probe of FIG. 1.

FIG. 4 shows a typical application of a probe of the type shown in FIGS. 1–3. The probe 52 comprises a housing 54 in which two passive geophones 56 and 58 are supported along an axis 60 extending in a direction x. The sensing axes of the geophones, that is the axes along which they are sensitive to velocity, are both aligned with axis 60, and corresponding parts of the two geophones are spaced by a distance $\Delta x$. The probe is immersed in a body of water having a surface 62 and exposed to a sound source 64 projecting an acoustic signal having an intensity $I_x$ in the x direction. The geophones in the probe are connected to a two-channel spectrum analyzer 66 through a cable 68. The spectrum analyzer is at a location above the surface of the body of water remote from the probe. The cable is connected directly to the geophone coils, there being no local preamplifiers within the probe.

With the submerged probe housing completely filled with water and the air entrained in the water purged, the apparatus is able to measure the intensity $I_x$ of the acoustic field by using the spectrum analyzer to compute the cross spectrum between the outputs of the two geophones. The manner in which $I_x$ is determined is as follows.

The active intensity $I_x$ in the frequency domain is $$I_x = \text{Re}[G_{pu_x}]$$

where $G_{pu_x}$ is the cross spectrum between the acoustic pressure p, and the x component of the acoustic particle velocity $u_x$, or $$I_x = \text{Re}[p^* u_x]$$

The velocity at the midpoint between the two geophones is defined as the linear average of the two output signals $U_{x_1}$ and $U_{x_2}$:

$$u_x = \frac{u_{x_1} + u_{x_2}}{2}$$

The pressure is determined from the velocity gradient across the geophones. This is done by substituting the equation of state into the equation of continuity. The equation of state is defined as $$p = \rho c^2$$

where $\rho$ is the dynamic component of the fluid density and c is the speed of sound in water. The equation of continuity is defined as $$\frac{\partial \rho}{\partial t} + \rho_0 \nabla \cdot \bar{u} = 0$$

where $\rho_0$ is ambient density of water and $\bar{u}$ is the velocity vector in three directions. Assuming time harmonic excitation in the form $e^{i\omega t}$, substitution of the equation of state into the equation of continuity yields the following result for pressure $$p = \frac{i\rho_0 c^2}{\omega} \vec{\nabla} \cdot \vec{u}$$

Because the geophones are uni-axial, their output is proportional to the particle velocity that is sensed in the x direction. Therefore, the equation for pressure reduces to $$p = \frac{i\rho_0 c^2}{\omega} \frac{\partial u_x}{\partial x}$$

For a geophone spacing $$\Delta x \ll \frac{\lambda}{4},$$

the velocity gradient can be approximated by $$\frac{\partial u_x}{\partial x} \approx \frac{\Delta u_x}{\Delta x}$$

Therefore, the pressure can be approximated as $$p = \frac{i\rho_0 c^2}{\omega} \frac{\Delta u_x}{\Delta x}$$

which can be expanded to $$p = \frac{i\rho_0 c^2}{\omega} (u_{x_2} - u_{x_1})$$

The complex conjugate of the pressure p* is given by $$p^* = \frac{i\rho_0 c^2}{\omega} \left( u^*_{x_2} - u^*_{x_1} \right)$$

The intensity $I_x$ is then $$I_x = \text{Re}\left[ \frac{i\rho_0 c^2}{2\omega \Delta x} \left( u^*_{x_1} - u^*_{x_2} \right)(u_{x_1} + u_{x_2}) \right]$$

This simplifies to an algebraic summation of the auto- and cross-spectra associated with the two geophones:

$$I_x = \frac{\rho_0 c^2}{2\omega \Delta x} \text{Re}[iG_{11} + iG_{12} - iG_{21} - iG_{22}]$$

The auto-spectra $G_{11}$ and $G_{22}$ can be eliminated because they are purely real functions. The intensity reduces to $$I_x = \frac{\rho_0 c^2}{2\omega \Delta x} \text{Re}[iG_{12} - iG_{21}]$$

Because $G^*_{12} = G_{21}$ the above equation can be simplified to:

$$I_x = \frac{\rho_0 c^2}{2\omega \Delta x} \text{Re}[iG_{12} - iG^*_{12}]$$

Because $G_{12}^* = G_{21}$ the above equation can be simplified to: Further simplification can be obtained by expressing the cross-spectra in terms of their real and imaginary components:

$$I_x = \frac{\rho_0 c^2}{2\omega \Delta x} \text{Re}[i(G^R_{12} + iG^I_{12}) - i(G^R_{12} - iG^I_{12})]$$

which simplifies to:

$$I_x = -\frac{\rho_0 c^2}{2\omega \Delta x} \text{Im}[G_{12}]$$

One of the significant advantages of the apparatus described is that the probe utilizes passive geophones exclusively, which, because of their inherently low output impedances, are capable of driving output signals over long distances without preamplification or other signal conditioning. This attribute greatly simplifies measurements at depths at which a conventional piezoelectric sensor would require preamplification. Another advantage of the apparatus is that it is less susceptible to measurement errors associated with hydrodynamic noise, because, unlike intensity probes utilizing pressure hydrophones, which must be directly exposed to flow, the geophones are immersed in a volume of still water inside a protective, acoustically transparent shell, and are therefore less susceptible to the effects of hydrodynamic noise.

Various modifications can be made to the apparatus described. For example, the shape of the probe shell need not be cylindrical. Moreover, the geophone mountings can be made from materials other then rubber, and their configurations can be different from those specifically illustrated.

Many other modifications and variations of the invention are possible in view of the above disclosure. It is therefore to be understood that, within the scope of the appended claims, the invention may be practiced other than as specifically described.

What is claimed is:

1. A method for measuring underwater acoustic intensity comprising the steps of:

submerging a sensor comprising two passive geophones in a body of water, the geophones being in spaced relationship to each other and having sensing axes in alignment alone a common axis;

exposing the geophones to an acoustic signal in said body of water;

transmitting output signals from the passive geophones, through cable means directly to analyzing apparatus on the surface at a location remote from said sensor, said output signals being independent of each other when received by the analyzing apparatus and being proportional to the acoustic particle velocity components along said axis as measured by the respective geophones; and computing the acoustic intensity along said axis, by means of said analyzing apparatus, from the output signals transmitted through the cable means, by calculating, from said acoustic Particle velocity components, the imaginary part of the cross-spectrum between the geophones.

2. The method according to claim 1, in which, when the sensor is submerged in a body of water, the geophones are situated within an acoustically transparent shell, filled with water or a water-like liquid.

3. The method according to claim 1, in which the geophones, when submerged, are magnetically shielded from each other.

* * * * *